Patented Oct. 19, 1948

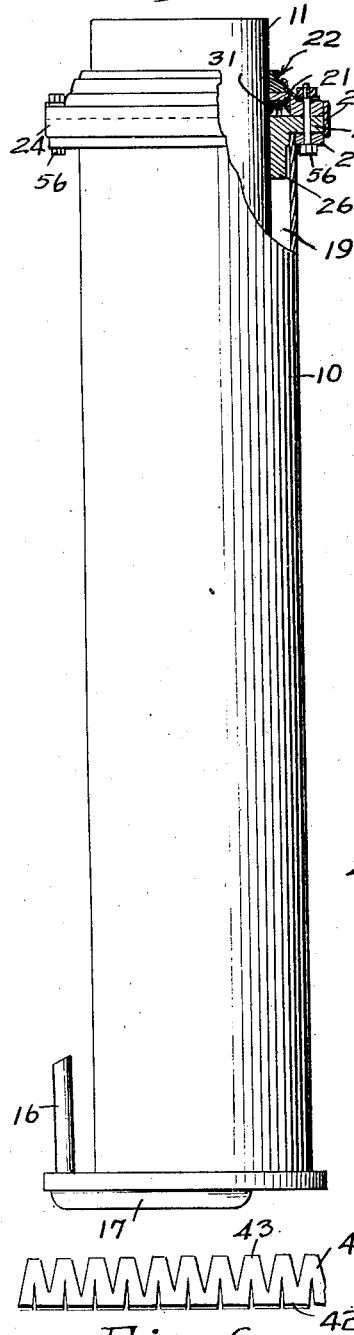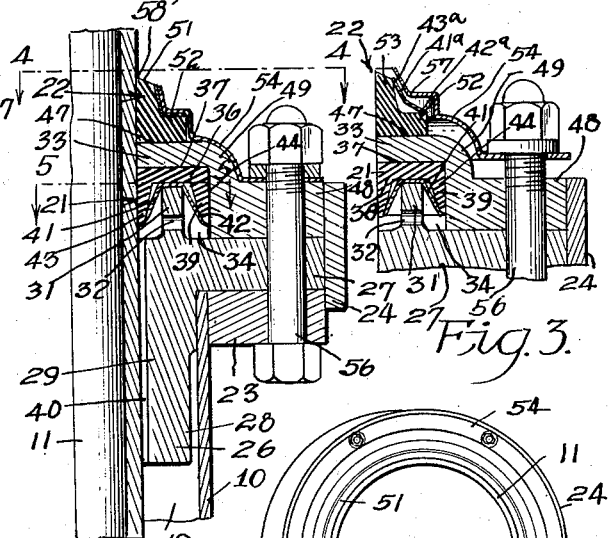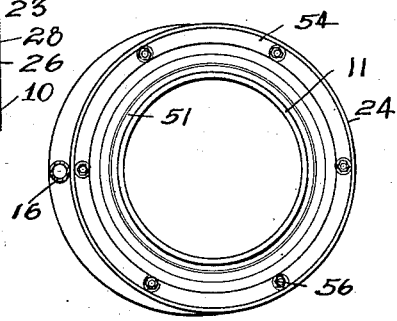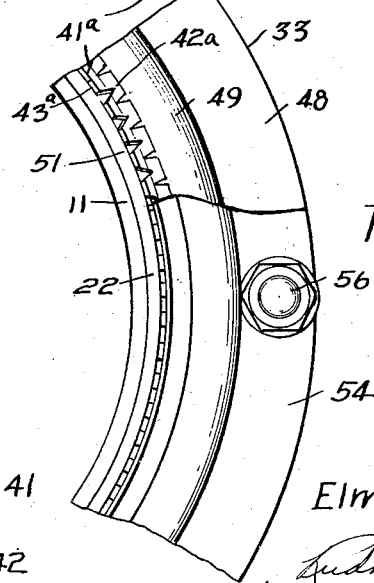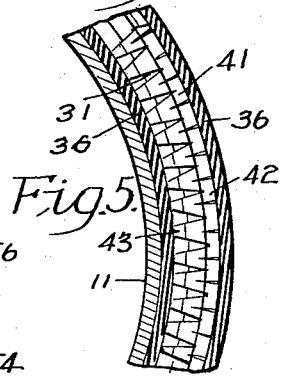
INVENTOR.
Elmer B. Thompson

2,451,888

UNITED STATES PATENT OFFICE 2,451,888

PISTON OIL SEAL AND WIPER ASSEMBLY

Elmer B. Thompson, Des Moines, Iowa, assignor to Globe Hoist Company, Des Moines, Iowa, a corporation of Iowa Application February 16, 1945, Serial No. 578,177

1 Claim. (Cl. 286—18)

This invention relates generally to vehicle hoists and in particular to an oil seal and wiper assembly for the lift piston in a hydraulic hoist.

In the use of automobile hoists for service work on automobiles or for automobile washing, that part of the lift piston which is extendible from the hoist cylinder is exposed to mud, grit, water and the like which might fall from the automobile. Where this foreign material is carried on the piston within the cylinder, the piston is soon scored or worn out and the oil within the cylinder impaired by its mixing with the foreign matter. Further in hydraulic automobile hoists oil oftentimes leaks out from the top of the cylinder and onto the floor about the hoist so as to be a source of inconvenience and physical hazard to the hoist operator.

It is an object of this invention, therefore, to provide an improved vehicle hoist of hydraulic type.

A further object of this invention is to provide an oil seal which substantially eliminates any leakage of oil from about the top of the lift piston in a vehicle hoist.

Yet another object of this invention is to provide an oil seal and a piston wiper assembly for the lift piston in a hydraulic hoist, which is of a substantially unit construction carried in a compact arrangement adjacent the upper end of the hoist cylinder.

A feature of this invention is found in the provision of a hydraulic hoist in which a piston oil seal and a piston wiper assembly is arranged adjacent the top end of the hoist cylinder as a compact unit in which the piston wiper serves to protect the oil seal against the passage thereto of water and the like which might be removed or wiped from the piston.

Further objects, features and advantages of this invention will become apparent from the following description when taken in connection with the accompanying drawings in which:

Fig. 1 is a side elevation of an automobile hoist of semi-hydraulic type with parts broken away and the piston oil seal and piston wiper assembly of this invention shown in section;

Fig. 2 is an enlarged showing of the piston oil seal and wiper assembly shown in section in Fig. 1;

Fig. 3 is a sectional view illustrated similarly to Fig. 2 and showing the parts thereof in a partly assembled position;

Fig. 4 is a sectional view taken on the line 4—4 in Fig. 2, with certain parts broken away to more clearly show the construction of the piston wiper of this invention;

Fig. 5 is a sectional view taken on the line 5—5 in Fig. 2;

Fig. 6 is a detail plan view of a spring member used in the combination assembly of this invention; and Fig. 7 is a plan view of the hoist shown in Fig. 1.

With reference to the drawings there is shown in Figs. 5 and 7 a vehicle lift of semi-hydraulic type including a cylinder 10 operatively associated with a hollow cylindrical lift piston 11 supported in a spaced relation within the cylinder 10. The piston 11 is of a hollow cylindrical construction with a suitable valve controlled opening in its lower end open to the cylinder 10, with the piston and the cylinder containing a liquid such as oil. In the operation of the hoist air under pressure is admitted from a suitable source (not shown) through a pipe 16 connected with a passage 17 in the base of the cylinder 10, with the passage 17 in turn being connected with an air conduit (not shown) extended upwardly through the cylinder base and into the piston 11 to a point above the level of the oil within the piston. On the introduction of air into the piston 11 a pressure is applied to the body of oil within the piston and cylinder whereby a lifting oil pressure is exerted against the bottom of the piston 11 to raise the same. As clearly appears in Fig. 1 the oil within the cylinder 10 also fills the space 19 between the cylinder and the piston 11 to lubricate the piston. It is necessary, therefore, to provide a piston oil seal, indicated at 21, to prevent the oil under pressure within the space 19 from leaking upwardly and outwardly from the upper end of the cylinder 10.

It is apparent also that in the operation of the hoist for car washing or repair purposes the piston 11 is extended far enough above the floor surface for the operator to stand upright under the car being serviced whereby a large portion of the piston 11 is exposed to mud, sand and the like which are deposited upon its oiled surface. To prevent this foreign material from travelling downwardly with the piston 11 into the cylinder 10 there is provided a piston oil wiper indicated generally at 22.

The piston oil seal and piston wiper assembly 23 of this invention includes an annular flange 23 carried about the upper end of the cylinder 10 and provided with an upwardly extended outer peripheral rim 24. An annular member 26 of a substantially L-shape in cross section and adapted to be slipped over the piston 11 has a horizontally extended portion 27 supported on the top surface of the flange 23 between the piston 11 and the rim 24, and a spacer portion 28 extended downwardly between the piston 11 and the cylinder 10, with the inner periphery 29 of the portion 28 constituting a bearing support for the piston 11. As clearly appears in Figs. 2 and 3 the member 26 is integrally formed with an annular projection 31 extended upwardly from the leg portion 27 at a position adjacent the piston 11. The projection 31 is formed with a plurality of angularly spaced laterally extended openings 32 for a purpose which will later appear.

A second annular member 33, adapted to be slipped over the piston 11 in a superposed position on the member 26 between the piston 11 and the rim 24, is formed with an annular recess 34 in its inner peripheral surface which is open to the piston 11 and to the member 26 to receive the projection 31. Also positioned within the recess 34 is an oil seal member 36 of a substantially inverted U-shape in cross section having its base portion against the recess top side 37 and its legs 38 and 39 extended toward the top side of the member 26 to receive the projection 31 therebetween. The recess 34 is in liquid communication with the space 19, between the cylinder 10 and piston 11, through an axially extended groove 40 formed in the inner periphery 29 of the annular member 26.

Extended between the leg portions 38 and 39 of the oil seal member 36 is a spring member 41 (Figs. 2 and 6) having oppositely arranged spring or finger portions 42 and 43. On reception of the projection 31 within the recess 34 the top side of the projection 32, as viewed in Fig. 2, engages the central portion of the spring member 41 to bend the spring between the leg portions 38 and 39 and against the base portion of the oil seal member 36. In this position of the spring member 41 the finger portions 42 and 43 are engaged with corresponding leg portions 38 and 39 respectively, so as to yieldably urge the leg portions away from each other. As a result the leg portion 38 is yieldably pressed against the outer periphery of the piston 11 to form an oil seal about the piston, while the leg portion 39 is yieldably pressed against the outer side 44 of the recess 34 to form an oil seal with the member 33 to prevent oil leaking between the outer side of the member 36 and the recess side 44.

The top surface of the annular member 33, as viewed in Figs. 2 and 3, is of a somewhat irregular contour having an upper flat horizontal inner portion 47 and a lower flat horizontal outer portion 48 substantially flush with the top of the rim 24, which two portions are connected together by an arcuate portion 49. The piston oil wiper 22 includes an annular wiper member 51 of a substantially L-shape in cross section, and composed of rubber or like resilient material, adapted to be slipped over the piston 11 with one leg portion 52 extended horizontally in a supported position on the surface 47 of the annular member 33, and its other leg portion 53 extended upwardly in contact engagement about the piston 11. A spring member 41a, similar in construction to the spring 41, is positioned on top of the wiper member 51 between adjacent edges of its leg portions 52 and 53 as clearly illustrated in Fig. 3. In the assembly of the piston oil seal and piston wiper unit of this invention an annular cover or clamping member 54 of an irregular shape in cross section is adapted to be clamped in a mating position on the wiping member 51, and the top portions 48 and 49 of the annular member 33. The clamping member 54, annular members 26 and 33, and the cylinder flange 23 are all formed with angularly spaced openings movable into aligned positions to receive bolts 56 which, on being tightened, clamp the members 54, 33 and 26 together against the flange 23.

On tightening of the bolts 56, and as clearly appears in Fig. 3, a shoulder 57 on the clamping member 54 engages the spring 41a at a position substantially intermediate the sides thereof, whereby opposite side portions of the spring 41a exert a yieldable pressure against the leg portions 52 and 53 of the wiper member 51. In other words the fingers 42a of the spring 41a yieldably urge the free end of the leg portion 52 in sealing engagement against the top surface portion 47 of the member 33, while the finger portions 43a yieldably press the free end of the leg portion 53 against the piston 11. The clamping member 54 in its final assembled position is in a mating covering relation with the top of the unit of this invention as illustrated in Fig. 2.

It is seen, therefore, that the piston oil seal and piston wiper unit of this invention are asassembled together about the upper end of the cylinder 10 in operative association with the piston 11 and maintained in assmebly relation by the bolts 56. It is to be noted also that the annular member 26 not only forms a part of the piston oil seal, but that its leg portion 28 constitutes a bearing support for the piston 11, to maintain the piston in a spaced relation with the cylinder 10.

In the operation of the invention on the introduction of air under pressure into the piston 11, a pressure is applied on the oil within the piston and the cylinder 10 which oil pressure exerts a lifting pressure on the lower end of the piston. Since the oil within the space 19 is also under the pressure of the air introduced into the piston, a portion of this oil enters the recess 34 through the passage 40, while other oil tends to enter the recess 34 between the piston 11 and the inner peripheral surface 29 of the member 26. By virtue of the openings 32 in the annular projection 31 the recess 34 is completely filled with oil to each side of the projection 31. With the recess 34 in oil communication with the space 19 through the passage 40 it is apparent that the oil within the recess 34 is also under pressure. This pressure is utilized in the present invention to aid the sealing action of the leg portions 38 and 39 of the oil seal member 36. Thus the pressure of the oil within the recess 34 acts against the inside of the leg portions 38 and 39 to supplement the action of the spring 41 in urging these portions away from each other. As a result of the sealing action of the member 36 with the piston 11, and the recess side wall 44 is increased with an increase of the pressure of the oil within the recess 34. Any oil, therefore, is substantially prevented from leaking by the leg portion 38 upwardly along the piston, and by the leg portion 39 to the upper side of the sealing member 36.

On a lowering of the piston 11 any foreign material such as water, sand and grit and the like accumulated on the outer surface of the piston 11 is wiped from the piston by the action of the wiping edge 58 at the upper end of the wiper member 51, which edge is yieldably pressed against the piston 11 by the action of the spring 41a. Any foreign material thus removed falls downwardly onto the top of the clamping member 54 and from there to the outside of the cylinder 10. In the event any moisture removed from the piston 11 should drain underneath the bottom side of the clamping member 54, such moisture is prevented from passing between the clamping member 54 and the member 33 to the piston 11 by the seal provided between the surface 47 of the member 33 and the free end portion of the leg 52 of the wiper member 51. The moisture thus prevented from passing between the members 51 and 33 is drained between the cover member 54 and the top surfaces 49 and 48 of the member 33 to the outside of the cylinder 10.

It is seen, therefore, that the invention provides an effective oil seal between the piston 11 and the upper end of the cylinder 10 and a piston wiper for wiping foreign material from the piston, and adapted to direct such foreign material to the outside of the hoist cylinder. Although the invention has been described and illustrated as applied to a semi-hydraulic hoist it is to be understood that it may be used in a full hydraulic hoist or in any piston and cylinder assembly in which the piston is operated by a liquid under pressure.

It is to be understood also that although the invention has been described with respect to a preferred embodiment thereof it is not to be so limited since changes and modifications can be made therein which are within the full intended scope of this invention as defined by the appended claim.

I claim:

In a hydraulic hoist having a cylinder with a piston therein, a flange about the top of said cylinder having a flat top surface with an upright annular projection thereon, a piston oil seal including a ring member having a flat bottom surface for mating engagement with said top surface, and an undercut recess for receiving said projection, a packing member of substantially inverted U-shape in cross section positioned within said recess, a first spring member positionable between the legs of said packing member and adapted to be engaged by said projection whereby to yieldably urge said legs apart from each other, a piston wiper of substantially L shape in cross section having one leg portion supported on the top of said ring member and the other leg portion in wiping engagement with the piston, a second spring member extended across the top of said wiper member between the ends thereof, a clamping ring adapted to fit over the top surfaces of said second spring member and said ring member, and means extended through said clamping ring, ring member and said flange to clamp the same together.

ELMER B. THOMPSON.

REFERENCES CITED

The following references are of record in the file of this patent:

UNITED STATES PATENTS

| Number | Name | Date |
| --- | --- | --- |
| 661,683 | Ball et al. | Nov. 13, 1900 |
| 1,700,894 | Joyce et al. | Feb. 5, 1929 |
| 1,757,724 | Larson | May 6, 1930 |
| 1,992,746 | Fortune | Feb. 26, 1935 |
| 2,165,052 | Hering | July 4, 1939 |
| 2,290,507 | Thompson | July 21, 1942 |
| 2,405,093 | La Brie | July 30, 1946 |